US008005664B2

(12) United States Patent
Hanumanthappa (10) Patent No.: US 8,005,664 B2
(45) Date of Patent: Aug. 23, 2011

(54) SYSTEM, METHOD TO GENERATE TRANSLITERATION AND METHOD FOR GENERATING DECISION TREE TO OBTAIN TRANSLITERATION

(75) Inventor: Ram Prakash Hanumanthappa, Tamilnadu (IN)

(73) Assignee: Tachyon Technologies Pvt. Ltd., Chennai (IN)

( * ) Notice: Subject to any disclaimer, the term of this patent is extended or adjusted under 35 U.S.C. 154(b) by 1011 days.

(21) Appl. No.: 11/812,319

(22) Filed: Jun. 18, 2007

(65) Prior Publication Data

US 2008/0270111 A1 Oct. 30, 2008

(30) Foreign Application Priority Data

Apr. 30, 2007 (IN) .............................. 914/CHE/2007

(51) Int. Cl.
*G06F 17/28* (2006.01)

(52) U.S. Cl. ..................................... 704/4; 704/8; 704/5

(58) Field of Classification Search .................. 704/4, 2, 704/5, 8, 277, 270; 715/205
See application file for complete search history.

(56) References Cited

U.S. PATENT DOCUMENTS

| 5,432,948 | A | | 7/1995 | Davis et al. |
| 5,640,587 | A | * | 6/1997 | Davis et al. ................... 715/205 |
| 7,177,794 | B2 | * | 2/2007 | Mani et al. ........................ 704/8 |
| 2005/0043941 | A1 | | 2/2005 | Janakiraman et al. |

* cited by examiner

*Primary Examiner* — Huyen X. Vo
(74) *Attorney, Agent, or Firm* — Oliff & Berridge, PLC (57) ABSTRACT

The transliteration scheme developed as the present invention is contingent upon two languages, namely the keyboard language and the target language. While the invention is independent of the actual languages in question, save to the extent that they must be phonetic or pseudo-phonetic and the keyboard language must possess a script, it is nonetheless convenient to cast the invention within the framework of two specific languages. In this regard, English has been chosen as the keyboard language, and Hindi (a language widely spoken in India) has been chosen as the target language. An understanding of the current invention is possible without any knowledge of Hindi by a practitioner skilled in the art.

27 Claims, 8 Drawing Sheets

10. PEEKAR

11. PIEKAR

12. PIKER

*FIG. 2*

13.
    <features unicode="u'\u0938'">

<properties>'s','cons','cons6'</properties>

<producer regex="u'(_s_)_nukta_?(?:_halanth_|_mathra_|$)'"value="(['s'],['s'])"/>

<producer regex="u'(?<!^)(_s_)_nukta_?(?!_dot_|_cons_$)'"value="(['sa'],['sa','s'])"/>

<producer regex="u'(_s_)_nukta_?'"value="(['sa'],['sa'])"/>

</features>

<features unicode="u'\u0939'">

<properties>'h','cons','cons6'</properties>

<producer regex="u'(_h_)_nukta_?(?:_halanth_|_mathra_|$)'"value="(['h'],['h'])"/>

<producer regex="u'(?<!^)(_h_)_nukta_?(?!_dot_|_cons_$)'"value="(['ha'],['ha','h'])"/>

<producer regex="u'(_h_)_nukta_?'"value="(['ha'],['ha'])"/>

</features>

14. <features unicode="u'\u0938'"> - स

15. <properties>'s','cons','cons6'</properties>

16. <producer regex="u'(_s_)_nukta_?(?:_halanth_|_mathra_|$)'"value="(['s'],['s'])"/>

| WORD | RELATIVE FREQUENCY |
|---|---|
| सिरीज़ | 13 |
| विश्व | 6 |
| प्रसारण | 3 |
| शतक | 2 |
| शनिवार | 1 |
| भाषाए | 1 |
| आभास | 1 |
| पाकिस्तानी | 1 |
| घोषित | 1 |

*FIG. 5*

```
<QuillWordList key="s" type="predictive">
    <QuillWord>
```
22. `        <Literal>vishv</Literal>`
23. `        <Focus>2</Focus>`
24. `        <ClassAssign> श </ClassAssign>`
25. `        <Count>6</Count>`
```
    </QuillWord>
    <QuillWord>
        <Literal>prasAran</Literal>
        <Focus>3</Focus>
        <ClassAssign> स </ClassAssign>
        <Count>3</Count>
    </QuillWord>
    <QuillWord>
        <Literal>prsaran</Literal>
        <Focus>2</Focus>
        <ClassAssign> स </ClassAssign>
        <Count>3</Count>
    </QuillWord>
```
26. `    <SpecialRule>['h', '(S)Is visarga?']</SpecialRule>`
27. `    <SpecialRule>['va','ch','bha','gha','za','sha','ga','kha','gh','cha','la','na','dha','kh','ny','pa','ra','th','nya','q','ta','ba','dh','ya','bh','sh','da','fa','jh','ha','ja','jha','ka','b','ma','d','g','f','h','K','j','m','l','n','qa','p','s','r','t','v','y','sa','z','tha','(S)Is cons?']</SpecialRule>`
28. `    <SpecialRule>['kha','kh','(S)Is kh?']</SpecialRule>`
29. `    <SpecialRule>['A','a','(S)Is A0?']</SpecialRule>`
`    <SpecialRule>['I','Ia','(S)Is I?']</SpecialRule>`
`    <SpecialRule>['','(S)Is nukta?']</SpecialRule>`
`    <SpecialRule>['cha','ha','ch','h','(S)Is ch?']</SpecialRule>`

SYSTEM, METHOD TO GENERATE TRANSLITERATION AND METHOD FOR GENERATING DECISION TREE TO OBTAIN TRANSLITERATION

FIELD OF THE INVENTION

The present invention relates to a Generic, Predictive, and Decision Tree Based Transliteration Engine with Automated Supervised Learning.

BACKGROUND OF THE INVENTION AND PRIOR ARTS

Transliteration of one language to another language is a field of software engineering with widespread applications. In the specific area of computer algorithms, advances in this field are often necessitated by constraints on software and hardware that users have to work with. For example, while there may exist software that accepts various languages as an input, such as e-mail, word-processing etc., keyboards may often be available or affordable only in the standard American layout. For a user to enter text in a different script from the script that the keyboard is designed to type in, transliteration remains the option of choice.

There are many approaches that have been tried with respect to effective transliteration, all of which are deficient in one manner or another. The most common approach is to encode the script of the language of the document (henceforth called the target language) in the language of the keyboard. This method is cumbersome, because it requires the user to memorize various long and often unintuitive keystrokes that correspond to the target language, in order to be able to type efficiently. A second approach is to allow the user to type in a word in the target language in the keyboard language in a manner that seems closest to it phonetically. This has the advantage of being intuitive, therefore not requiring any 'learning' besides knowledge of the target language and the keyboard language.

However, the state of the art in this particular approach to transliteration is primitive. There are several reasons for this. The most prominent reason is that of input ambiguity. Since there may not be one correct way to phonetically represent a word belonging to the target language in the keyboard language, the mapping between phonetic input in the keyboard language and the symbolic output in the target language is a many-to-many mapping. Many contemporary transliteration systems require the user to learn unique combinations for each phonetic unit, or phoneme, of the target language, and use such combinations while entering the text phonetically in the keyboard language. Contemporary systems reject any other phonetic representations of the target text.

Another problem in existing transliteration schemes is the problem of missing phonemes. The symbols and characters in the keyboard language may not be able to represent completely all the phonemes of the target language. Thus, a user can only enter an 'approximately phonetic' version of the text. This approach has two limitations. Either the user will have to learn a letter combination that is distinct and which maps to the phoneme in question, or the sequence of characters entered by the user may clash with a different phoneme in the target language. The former approach is non-intuitive and requires training on the part of the user. The latter approach may cause an inaccurate transliteration of the text.

To complicate the situation further, there may already be native conventions for translation of one language to another. A user must be able to adhere to this convention and expect accurate transliteration, while at the same time; an untrained user must also be able to expect accurate transliteration from an intuitive transliteration method. Further, many languages often borrow words from one another, and it is not uncommon to find a word in the target language that has been borrowed from the keyboard language. In such a situation, the user may confidently assume that he or she may spell the word in the manner that it is spelt in its native language, though such a spelling may not be phonetically accurate. A transliteration system is expected to handle this situation also accurately.

The user is often prompted to choose between various alternatives from a dictionary for a word that he or she has transliterated. This causes the typing process to be considerably slower and more cumbersome than, for instance, typing directly in the target language on a modified keyboard.

There is a need, therefore, for a fast, efficient and accurate method of automatically transliterating text that is phonetically created in one language to another language. This is the need that this invention attempts to address.

Some of the prior arts related to transliteration systems are disclosed below. These prior arts appear to be very close to the present invention, however each of them differs from the instant invention. The distinct feature is explained at the end of the Prior arts.

Document D1: U.S. Pat. No. 5,432,948 "Object-Oriented Rule-Based Text Input Transliteration System"

This document discloses the invention related to a computer implemented system and method utilizing rules instantiated in objects of an object-oriented operating system to transliterate text as it is input into a computer is disclosed. A number of transliterator objects are created in the storage of the computer, each one of the transliterator objects include transliteration rules arranged in the storage in a preferred order. Each of the transliteration rules contain a first language character string, a second language character string, and logic for comparing the first language character string in each of the transliteration rules to a text string that is entered into a computer to determine a subset of transliteration rules which match the entered text string. The entered text is displayed on a computer display as it is input into a computer and a particular one of the plurality of transliterator objects' logic is utilized in response to the preferred order for selecting one of the subset of transliteration rules and applying it to the first text string to display the second language character string of the selected transliteration rule on the display.

Document D2: U.S. Pat. No. 5,640,587 "Object-Oriented Rule-Based Text Transliteration System"

This document discloses a computer system transliterates a text string from a first language to a second language using transliterator objects, each having a set of transliteration rules arranged in a preferred order. Each of the transliteration rules, in turn, has a test string and a replacement string and the transliterator object includes a method for comparing the test string in each of the transliteration rules to each of the characters in the text string to determine a subset of transliteration rules which exhibit a match. Using the preferred order, one of the subset of transliteration rules is selected and the replacement string of the selected transliteration rule is substituted for the test string in the text string.

Further, the invention discloses method operable on a computer system having a memory, an input device and a display device, the method displaying on the display device a text string including one or more characters in response to a character being entered from the input device at an insertion point in the text string by     (a) creating a plurality of transliteration rules in the memory, each of the plurality of transliteration rules having a source string comprised of a plurality of characters and a result string comprised of at least one character;

(b) receiving a character entered on the input device;

(c) inserting the entered character into the text string at the insertion point and moving the insertion point after the inserted character;

(d) sequentially comparing source strings in the plurality of transliteration rules to text string characters preceding the insertion point to detect a match of one transliteration rule source string;

(e) redisplaying the text string on the display with result string characters in the one transliteration rule substituted for source string characters found in the text string; when a match is detected in step (d); and (f) redisplaying the display text string on the display with the entered character inserted at the insertion point when no match is detected in step (d).

Document D3: United States Patent Application 0050043941 "Method, Apparatus, and Program for Transliteration of Documents in Various Indian Languages"

This invention relates to transliteration mechanism is provided that allows a user to view a text in one Indian language, to highlight a word or phrase, and to easily transliterate the selected word or phrase into a target language or script. The mechanism may be an application, an applet, or a plug-in to another application, such as a Web browser. The target language and/or script may be stored in a user profile. Preferably, the source language may be any known Indian language in any known script and a method for transliteration of text in Indian languages, the method comprising: identifying a selected portion of a text in an Indian language; and transliterating the selected portion into a target script to form transliterated text, wherein the target script is identified in a user profile.

Though, all the documents D1 to D3 are related to Transliteration System and method thereof, they differ in the methodology used to derive transliteration from one language to another language (source language to target language).

Further, no documents D1 to D3 disclose the transliteration using decision tree based algorithm or mechanism. The crux of our invention lies in building producer rule and Special Rule and thereafter using the same rules for decision making.

In addition to this, our invention is language independent, whereas Documents D1 and D2 are language specific.

Document D1 is based on a number of transliterator objects that are created in the storage of the computer; each one of the transliterator objects include transliteration rules arranged in the storage in a preferred order which is not in our case.

Document D2 is mainly based on a Transliterator object which is used to perform transliterations. Input transliterators are composed of a set of context-sensitive rules. Hence, this technology is based on rule based transliteration mechanism, which is not in our case.

Document D3 wherein prima facie appears to be similar as our invention but it neither discloses the method used in transliteration nor transliteration is performed on the fly. The document D3 primarily discloses the technology of transliteration only for the selected portion of text, wherein it does not support for dynamically inputting text. It also failed in disclosing the transliteration using decision tree based algorithm or mechanism.

OBJECTS OF THE INVENTION

The primary object of the present invention is a Generic, Predictive, and Decision Tree Based Transliteration Engine with Automated Supervised Learning.

Yet another object of the present invention is to provide a fast, efficient and accurate method of automatically transliterating text that is phonetically created in one language to another language.

Still another object of the present invention is to provide a method for generating decision tree to obtain transliteration of source language into target language.

Still another object of the present invention is to provide a system to generate transliteration of source language into target language using decision tree based technique with automated supervised learning.

Still another object of the present invention is to provide method and system to overcome the aforementioned potential limitations.

Still another object of the present invention is automated English-to-regional language transliteration according to the native pronunciation

SUMMARY OF THE INVENTION

The present invention relates to a method to generate transliteration of source language into target language using decision tree based technique with automated supervised learning, said method comprising steps of selecting text to identify predetermined character to train particular instance of usage of identified character; representing various possible phonetic and/or pseudo-phonetic translations of identified character to generate a multitude of transliterated words; grouping generated words followed by annotating them with predetermined information; analyzing annotated words to represent possible decision questions to map the characters under the focus; applying predetermined rules on analyzed words to generate transliteration of the source language into the target language; also, a method for generating decision tree to obtain transliteration of source language into target language, said method comprising steps of generating all possible tuples of semantic-groups along with a focus number; applying the generated tuples to set of training words; dividing the training words into two sets depending upon whether the words satisfy the query posed by the tuples or not; adding the tuple as a node for two sets of trained words to generate the decision tree; and also a system to generate transliteration of source language into target language using decision tree based technique with automated supervised learning, said system comprises a device having memory; an input device for entering text; transliteration engine to maintain patterns and predetermined rules used in transliteration of source language into target language; a display device for displaying entered text and transliterated text; and an interface to enable typing in any languages and optionally to integrate the transliteration system into existing web-pages.

BRIEF DESCRIPTION OF THE ACCOMPANYING DRAWINGS

FIG. 6 shows a snippet from the training file generated from the words in FIG. 5.

FIG. 7 shows a flowchart that extracts a decision tree from the training file of which FIG. 6 is a portion.

DETAILED DESCRIPTION OF THE INVENTION

The primary embodiment of the present invention is a method to generate transliteration of source language script into target language script using decision tree based technique with automated supervised learning, said method comprising steps of selecting text to identify predetermined character to train particular instance of usage of identified character; representing various possible phonetic and/or pseudo-phonetic translations of identified character to generate a multitude of transliterated words; grouping generated words followed by annotating them with predetermined information; analyzing annotated words to represent possible decision questions to map the characters under the focus; and applying predetermined rules on analyzed words to generate transliteration of the source language into the target language.

In yet another embodiment of the present invention is the method, which is used to generate transliteration is independent of the languages.

In still another embodiment of the present invention is the method provides predetermined rules for reverse transliteration from the target language script to the source language script.

In still another embodiment of the present invention is the source language is a keyboard language preferably English and target language is any predetermined language preferably selected from a group comprising Kannada, Hindi, Telugu, Tamil, Marathi, Malayalam and Gujarati.

In still another embodiment of the present invention wherein the character is identified by means of any representational scheme such as Unicode.

In still another embodiment of the present invention is, predetermined properties/characteristics corresponding to different characters of the target language, independent of the method itself are used in forming the decision question.

In still another embodiment of the present invention is the multitude of possible transliterations is used to train the transliteration engine.

In still another embodiment of the present invention is the information for annotating the words is position of the character within a word under focus and generated target language character.

In still another embodiment of the present invention is the method provides frequencies of the words from the text by maintaining a running counter for each unique word.

In still another embodiment of the present invention is the position of the character is indexed beginning with the number zero.

In still another embodiment of the present invention is the predetermined rules are selected for a character depending upon the semantic-groups to which it belongs.

In still another embodiment of the present invention is the method automatically learns the particular language word patterns by parsing web pages and/or predetermined documents containing language content.

In still another embodiment of the present invention is the method automatically predicts the transliteration of each letter depending on context around the letter.

In still another embodiment of the present invention is the method operates by applying patterns from its learnt knowledge base rather than matching words in any database.

In still another embodiment of the present invention is the method captures frequency of each letter in a context specific manner to determine the mapping.

In still another embodiment of the present invention is the method performs reverse transliteration from predetermined language to the source language.

In still another embodiment of the present invention is the method uses semantic context rather than character level context to identify the transliteration.

In still another embodiment of the present invention is the method automatically transliterates source language words to target language based on native pronunciation of the target language.

In still another embodiment of the present invention is the method shows available multiple transliterations for a particular input text to choose the most appropriate transliteration.

In still another embodiment of the present invention is the method with heuristics to decide whether the input is for predictive or non-predictive rule-based transliteration, options for rule-based input as well without the user explicitly having to choose a user interface element to switch between the predictive and non-predictive modes.

In still another embodiment of the present invention is a method for generating decision tree to obtain transliteration of source language script into target language script, said method comprising steps of generating all possible tuples of semantic-groups along with a focus number; applying rules representing generated tuples to set of training words; dividing the training words into two sets depending upon whether the words satisfies the query posed by the tuples or not; and adding the tuple as a node for two sets of trained words to generate the decision tree.

In still another embodiment of the present invention is the method is repeated until entire set of words is found to be segregated or none of the rules is able to decide between the words at leaves of the tree.

In still another embodiment of the present invention is the focus number specifies context around the particular letter on which rules to be applied.

In still another embodiment of the present invention is the focus number is predetermined number preferably between −4 and 4.

In still another embodiment of the present invention is first set of the two sets comprises the words for which the question asked by the tuple is answered "yes" and other is answered "no".

In still another embodiment of the present invention is the method used to generate decision tree is language independent.

In still another embodiment of the present invention is the semantic-groups selected from a group comprising vowel, consonant, long vowel, short vowel, aspirated, unaspirated or non-language related predetermined groups like groupA groupB etc.

In still another embodiment of the present invention is a system to generate transliteration of source language script into target language script using decision tree based technique with automated supervised learning, said system comprises a device having memory; an input device for entering text; transliteration engine to maintain patterns and predetermined rules used in transliteration of source language script into target language script; a display device for displaying entered text and transliterated text; and an interface to enable typing in any language and optionally to integrate the transliteration system into existing web-pages.

In still another embodiment of the present invention is the device having English alphabet layout is used for typing non-English words phonetically.

In still another embodiment of the present invention is the interface for using the transliteration mechanism is placed in any existing web pages or web applications or non-web applications in general and specifically as input interface for search engines, composition of emails and blogs and text editing applications.

In still another embodiment of the present invention is the transliteration engine is completely independent of the web-server setup or the application with which the transliteration engine is integrated.

In still another embodiment of the present invention is the device is any predetermined system having an input device for inputting source language alphabet like computer systems with keyboards with complete English alphabet and/or with hand-writing recognition, mobile phones and telephones with numeric keypad layouts and/or hand-writing recognition.

In still another embodiment of the present invention is the display device uses single and/or dual panel interface for displaying entered text.

In still another embodiment of the present invention is the interface is an AJAX interface, which keeps entire knowledge base on the server side.

In still another embodiment of the present invention wherein the system adapts to low resource environments such as mobile phones, where the amount of memory available is a constraint, by having a disk based decision tree without having to load the entire tree into memory.

In still another embodiment of the present invention is the server is platform-independent.

The transliteration scheme developed as the present invention is contingent upon two languages, namely the keyboard language and the target language. While the invention is independent of the actual languages in question, save to the extent that they must be phonetic or pseudo-phonetic and the keyboard language must possess a script, it is nonetheless convenient to cast the invention within the framework of two specific languages. In this regard, English has been chosen as the keyboard language, and Hindi (a language widely spoken in India) has been chosen as the target language. An understanding of the current invention is possible without any knowledge of Hindi by a practitioner skilled in the art.

The following examples are given by way of illustration of the present invention and should construed to limit the scope of the present invention.

Figure 1:
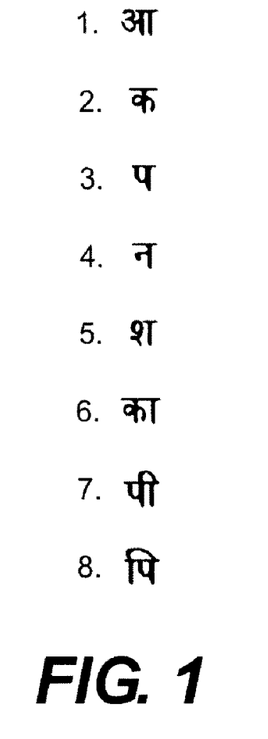
FIG. 1 shows a selection of Hindi characters and their corresponding common English transliterations.

FIG. 1 shows a selection of Hindi characters and their corresponding common English transliterations. The characters 1,2,3,4 and 5 represent, respectively, the sounds 'aa', 'k', 'p', 'n' and 'sh'. Character 1 is a vowel; characters 2 to 5 are consonants. Each vowel or consonant has a unique representation in standard Unicode.

In the Hindi language, vowels are conjoined with consonants by means of a modifying mark called a 'matra'. The characters 6, 7 and 8 shown in FIG. 1 illustrate some of the matras. For instance, the character 6 is pronounced 'kaa' and is the conjunction of the consonant 'k' and the matra for the vowel 'aa'. Character 7 is pronounced 'pee' and is the conjunction of the consonant 'p' and the vowel 'ee'. Character 8 is pronounced 'pi' (as in the English word 'pick'), and is the conjunction of the consonant 'p' and the vowel 'e', which is the unstressed form of the vowel 'ee'. The pronunciations of the former and latter vowels are identical to the pronunciations of the vowels in the English words 'pick' and 'Peter', respectively.

Figure 2:
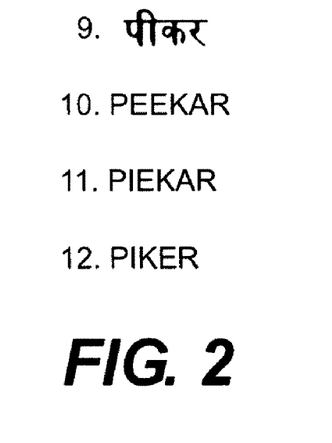
FIG. 2 shows various possible transliterations of a particular Hindi word.

FIG. 2 shows the Hindi word 9 that is pronounced 'peekar', meaning 'while drinking', and its possible transliterations 10, 11 and 12 into English. The reason that transliteration becomes a challenge between the pair of languages Hindi and English, is that English and, to a lesser extent, Hindi, are only pseudo-phonetic. Thus, a single English character, such as 'e', may have multiple pronunciations depending on the word that it is found in. Hindi pronunciation is also not entirely straightforward despite it being a phonetic language. This is particularly true for consonants in words that do not have a 'matra'. These words may be pronounced either with or without an implicit 'a' sound depending on their position in a word and their neighbours.

For instance, the character 'k' in the word 9 is pronounced 'ka' in the absence of a 'matra'. However, the character 'r' in the word 9 is pronounced unaspirated in the absence of a 'matra'. This behaviour is not the consequence of the particular consonants chosen in this example. There are words in the Hindi language in which the 'r' sound may have an implicit 'a' vowel and the 'k' sound may be unaspirated.

The words 10, 11 and 12 are equally valid transliterations of the word into English. The word 10, 'peekar', uses the moiety 'ee' to represent the matra attached to the 'p' character.

The word 11, 'piekar', uses the moiety 'ie', pronounced as in the word 'piece', to represent the same sound. The word 12, 'piker', uses the single letter 'i' to represent the sound, though perhaps inaccurately. The challenge addressed by this invention is, therefore, to accurately reconstruct the Hindi word 9 from any of the three transliterations 10, 11 and 12, from the context of the characters within the word.

Figure 3:
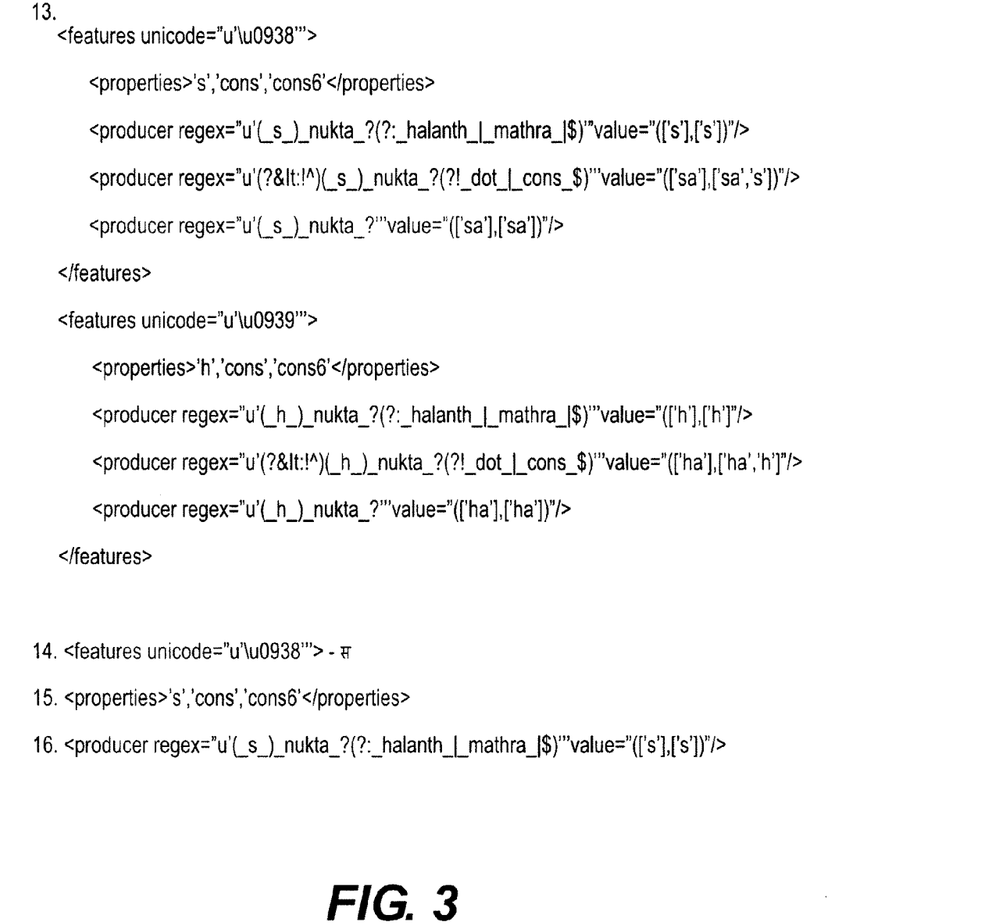
FIGS. 3 and 3A shows a list of rules for generating transliterations of a particular Hindi character.
Figure 3A:
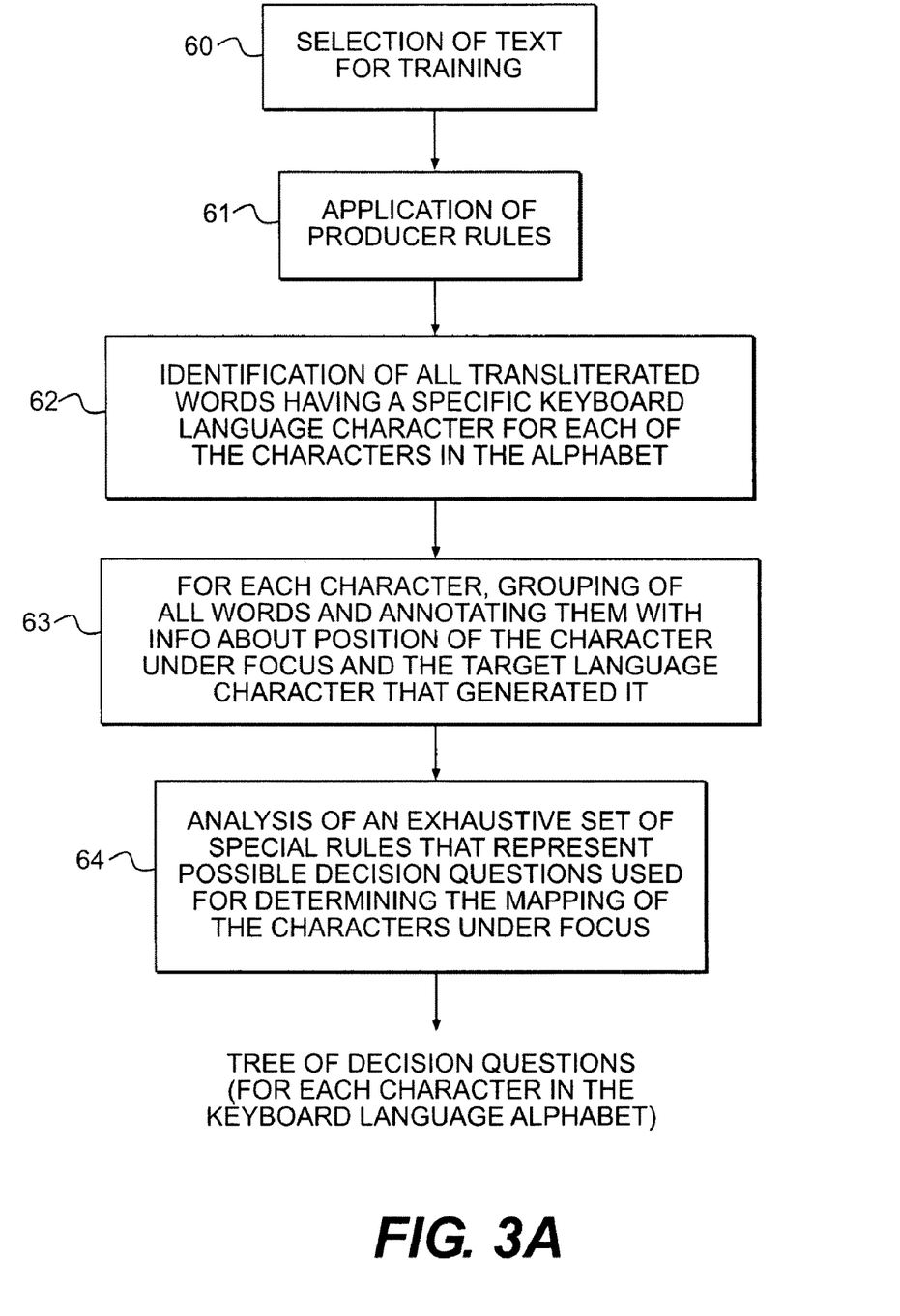

FIGS. 3 and 3A shows the first step towards this end, namely a list of rules 13 about the target language described in terms of the keyboard language. The rules may be considered a set of 'producer rules', which specify the characters of the keyboard language that will be produced by particular patterns of characters in the target language. These rules may be encoded in a variety of ways, such as the binary code of a computer program, or as a sequence of bits on a computer medium such as a magnetic disk or a magnetic tape, or as a file in a file system that is part of an operating system such as Windows from MICROSOFT INC. of Redmond, Wash. For the purpose of this document, the rules are assumed to be encoded in Extensible Markup Language, or XML, and stored as a file in a file system, accessible to other computer programs. While this file constitutes part of the invention, it is external to the transliteration engine itself, thereby retaining a degree of independence between the engine and the languages used.

Each rule in the list 13 is a combination of three parts. The first part 14 of the rule is called a 'feature', and identifies the character or partial character being described. The character may be identified by means of any representational scheme, such as Unicode. In the figure, the line 14 represents the character pronounced 's'. The second part 15 of the rule is a property of the character. This is user-specified, and may take any values that would describe the character to the user. The properties of a character are used in forming decision questions, as will be shown in FIG. 7.

The third part 16 of the rule describes a generating function that maps the Hindi character described by 14 and 15, into one or more English representations. This is called the 'producer'. The producer contains two parts. The first part is a regular expression that specifies a particular instance of usage of this character. For example, the first part of line 16 describes the instance of the character 's' at the end of a word. The second part is called a 'value', and represents the various possible phonetic or pseudo-phonetic translations of the character in rule 14, in the position or context described by the regular expression, in the keyboard language.

The producer rules described by FIG. 3 allow a particular word or phrase in the target language to be programmatically mapped to various possible ways of transliterating it in the keyboard language, considering it one character at a time but taking note of the context that the character appears within the word. The role of the producer rules is therefore central to the transliteration scheme proposed in this invention. By running the producer rules over standard text in the target language, it is possible to get a multitude of possible transliterations of it in the keyboard language, which are then used to train the transliteration engine.

The process of training is summarized in the flowchart shown in FIG. 3a. The first step 60 in training the system is the selection of a particular text, or set of texts, to train the transliteration engine with. The second step 61 runs the producer rules on the entirety of the text chosen, generating a multitude of transliterated words. The third step 62 is performed for each character in the keyboard language, and comprises of identifying all words in the multitude of transliterated words generated in step 61, containing the particular character chosen for analysis. The fourth step 63 is also performed for each character in the keyboard language. In this step, the words identified in step 62 are grouped together and are annotated with the position of the keyboard character under focus, and the character in the target language that generated it. This mapping of the keyboard character and its position within a word, to the target character that it transliterates, is the crux of the learning algorithm, as will be made clear in the subsequent figures.

The next step 64 is also performed for each character in the keyboard language. In this step, the mappings produced in step 63 are used to analyze an exhaustive set of 'special rules' that represent possible decision questions used to determine the mapping of the character under focus. The output of step 64 is a tree of decision questions that are able to accurately identify the character in the target language that a character in the keyboard language represents, given its context in the word.

Figure 4:
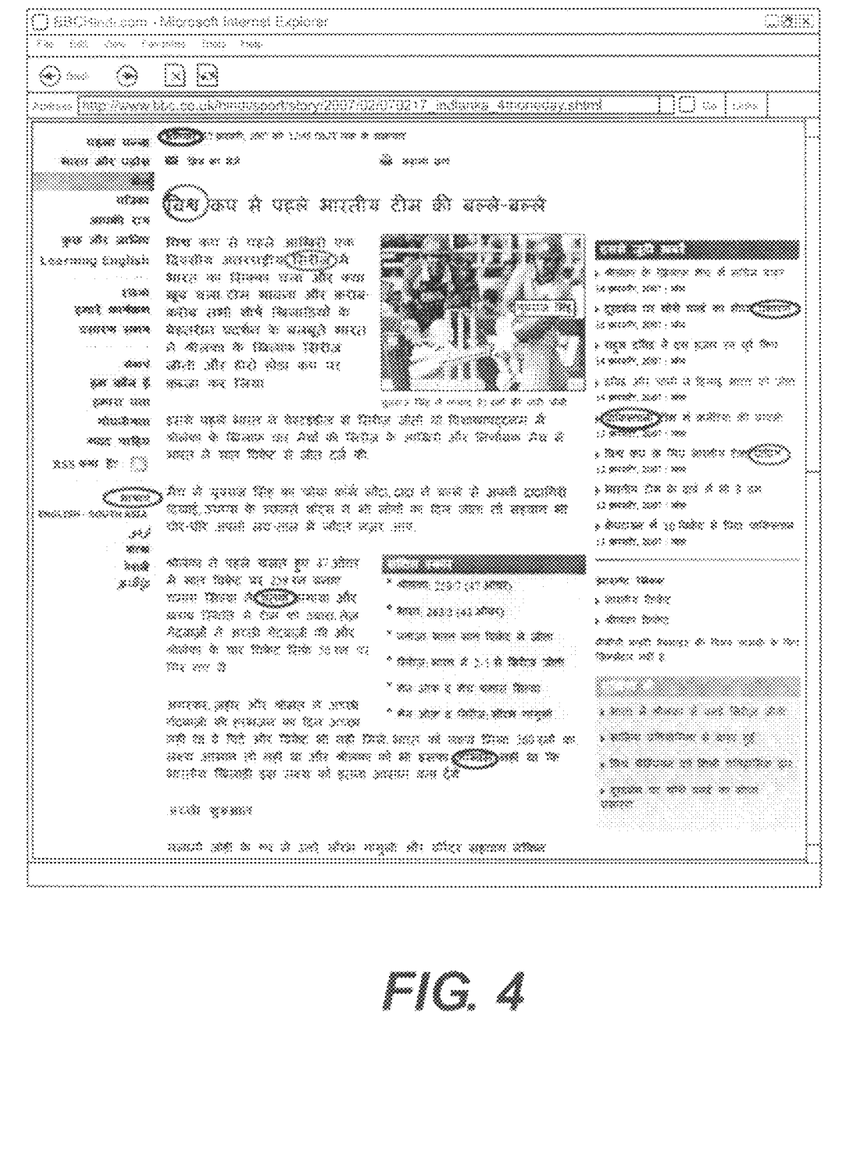
FIG. 4 shows a sample text which is used for training the transliteration engine.

FIG. 4 shows a typical page of Hindi text 16 which is used to train the system. The text in FIG. 4 is taken from a website run by the British Broadcasting Corporation on the internet location http://www.bbc.co.uk/hindi, accessed through the Hyper-Text Transport Protocol (HTTP). In practice, the training set for the system may be taken from any Hindi source, such as a web-site, textbooks, newspapers, and other documents in which the usage of words and characters may be assumed to be roughly representative of their common usage.

The circled words 17 in the text 16 are picked out for a specific reason, in that when the rules described in FIG. 3 are run on the Unicode characters that constitute them, all of them generate a common transliterated English character, in this case the letter 's'. These words will be used to train the system to correctly transliterate the English character 's' into Hindi.

Figure 5:
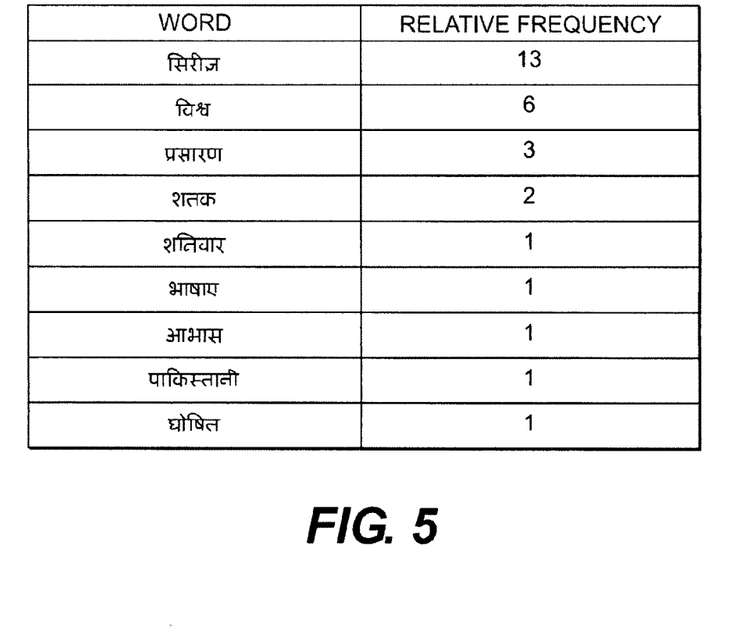
FIG. 5 shows a set of nine words extracted from the text in FIG. 4, which are used to train the translation engine for the particular letter 's'.

FIG. 5 shows a sample of nine Hindi words that are extracted from a sample training document. The words are chosen because all of their transliterations contain the English character 's'. These nine words illustrate how the process of training is performed in order to accurately perform the reverse transliteration of the letter 's' into one of several characters that produce it, depending on the context of the character 's' in the transliterated word.

The nine words in FIG. 5 are arranged in two columns 20 and 21. The first column 20 contains the Hindi word, presented here in a Unicode-compliant font. It will be evident that the method of representation of the word on a computer medium is immaterial to the content of this invention. The second column 21 contains the relative frequency of the word in column 20 in the text from which the word was chosen. Hence, the first word (pronounced 'sireej') appeared thirteen times, the second word (pronounced 'vishwa') appeared six times, and the third word (pronounced 'prasaran') appeared thrice. The frequencies of the words may be calculated trivially from the text 16 shown in FIG. 4 by maintaining a running counter for each unique word that is found in the text containing a particular target character, in this case the letter 's'.

Turning now to FIG. 6, the manner in which training is performed from the words shown in FIG. 5 is shown. FIG. 6 is expressed for the purpose of explanation as a snippet from an XML file, though it may be rendered in a plurality of other ways on a computer system and apparatus that implements the invention. The file, of which FIG. 6 is a snippet, consists of two kinds of entries. The first kind of entry is a training word. The training words are represented in the keyboard language, and the set of training words is generated from the multiplicity of outputs produced by running the producer rules described by FIG. 2 on the words shown in FIG. 5.

Each entry contains four parts, annotated in FIG. 6 as the Literal field 22, the Focus field 23, the Class Assign field 24 and the Count field 25. The Literal field 22 contains the output of the producer rules for a word shown in column 20 of FIG. 5. This represents a possible transliteration of the word in English. The Focus field 23 represents the position of the character under focus (in this example the letter 's') in the Literal field 22. The position is indexed beginning with the number zero. Hence, if the letter 's' appears as the first character of the transliteration (as shown), the focus field is assigned the value zero.

The Class Assign field 24 represents the Unicode character in the target language on which the producer rule was applied to obtain the character under focus. Here, the Class Assign field contains the Unicode character for the Hindi letter 's', which was the letter in the text shown in FIG. 4 and the first word shown in FIG. 5 from which the Literal field 22 was obtained by applying the producer rules. The Count field 25 represents the number of times the word producing this entry appeared.

An entry similar to the one described in FIG. 6 is generated for each possible transliteration generated by the producer rules for each word in the word list extracted from the training set. Between them, these entries specify all possible ways in which the character under focus, in this case the letter 's', may appear in the target language.

The second kind of entry in the XML file of which FIG. 6 is a snippet, is called a "Special Rule", and is illustrated by the box 26 in the figure. Each "Special Rule", such as the rules 27, 28 and 29, represent a question that would later form all or part of a decision tree that is traversed to classify a word. The Special Rules are specified along with the producer XML file, and are common for a particular language.

The box 26 illustrates three different rules. Rule 27 whether a character is a consonant. Rule 28 asks whether a character is the specific consonant 'kh'. Rule 29 asks whether a character is the vowel 'aa'.

The objective of the invention is now to find a set of questions, each consisting of a rule such as 27, 28 or 29, paired with a character from the context of a letter in the keyboard language that will specify how to transliterate a particular character in the keyboard language to the correct character in the target language.

Figure 7:
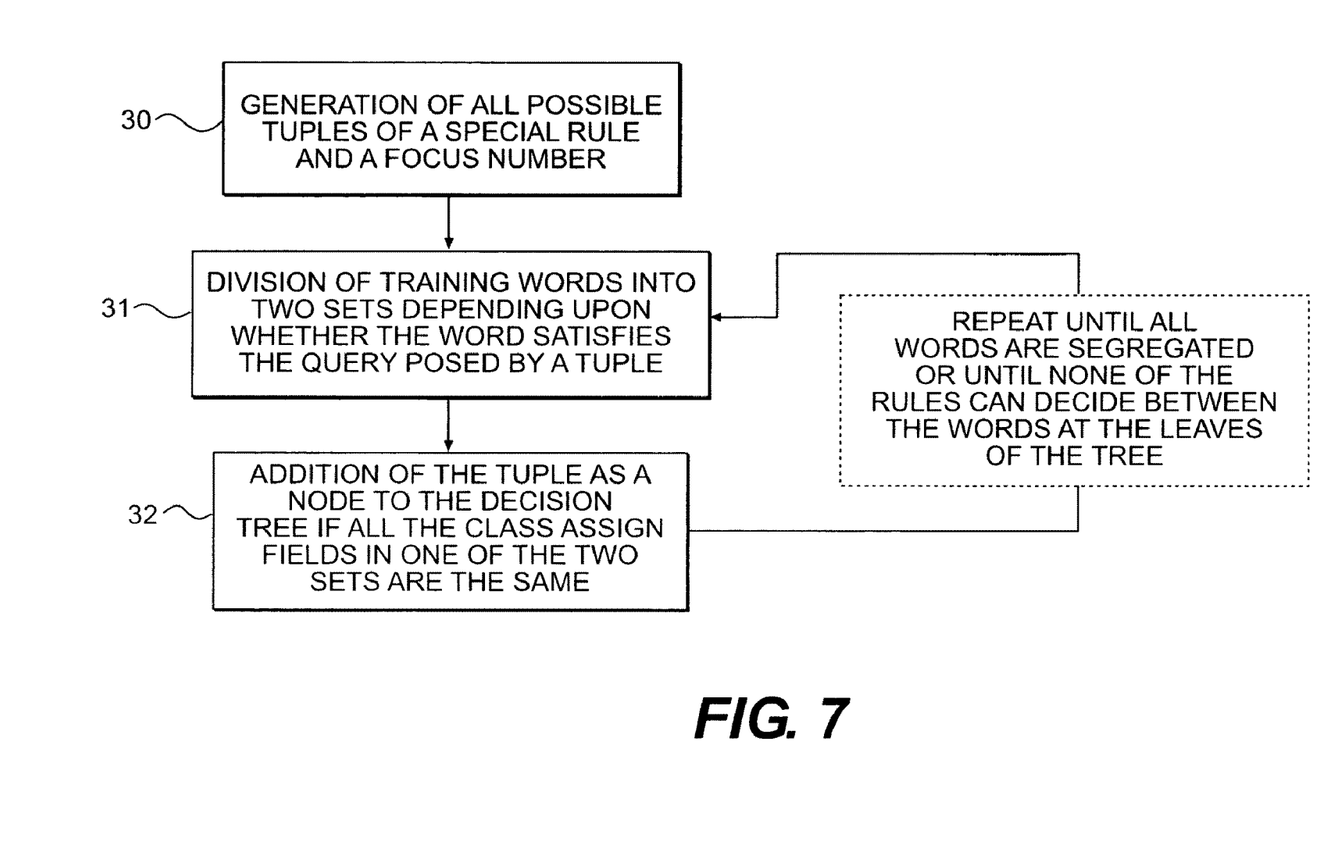

The flowchart shown in FIG. 7 describes how this is accomplished. The first step 30 is to generate all possible tuples of a Special Rule and a 'focus number' between −4 and 4. The 'focus number' specifies the context around the particular letter (such as 's' in our example) on which the rule must be applied. For example, if the rule 27 is paired with the focus number −1, the question asked is whether the character preceding the 's' (i.e., the character at a position one character to the left of the 's') is a consonant. If rule 29 is paired with focus number 2, the question asked is whether the character that is present two characters from the 's' and on the right of the 's' is the vowel 'aa'.

In the next step 31, each of the tuples generated in step 30 are applied to the set of training words in FIG. 6. The training words are consequently divided into two sets, one set being comprised of the words for which the question asked by the tuple is answered 'yes', and the second set being comprised of words for which the question is answered 'no'.

The next step 32 now considers the words that comprise of each set, and in particular their Class Assign fields. If all the Class Assign fields in one of the two sets contains the same character, this means that the tuple generated in step 31 has been successfully able to identify the set of characters in the keyboard language that produce this character in the target language. This tuple becomes the first node in the decision tree.

Once this tuple has been found, step 31 is repeated again with the next tuple, but without the words that were successfully found in step 32. Again, the best decision-making tuple is found. If a tuple cannot be found that is able to fully segregate the set of training words, the tuple that best differentiates them is chosen.

The process described in steps 30 to 32 is repeated until the entire set of words is found to be segregated, or until none of the rules is able to decide between the words at the leaves of the tree. In the former case, the letter under focus ('s' in our example) will have been successfully trained for transliteration. In the latter case, the letter under focus cannot be trained perfectly, and a set of options will be presented to the user amongst the possible characters that are generated in the decision sets at the lowest leaf nodes.

Figure 8:
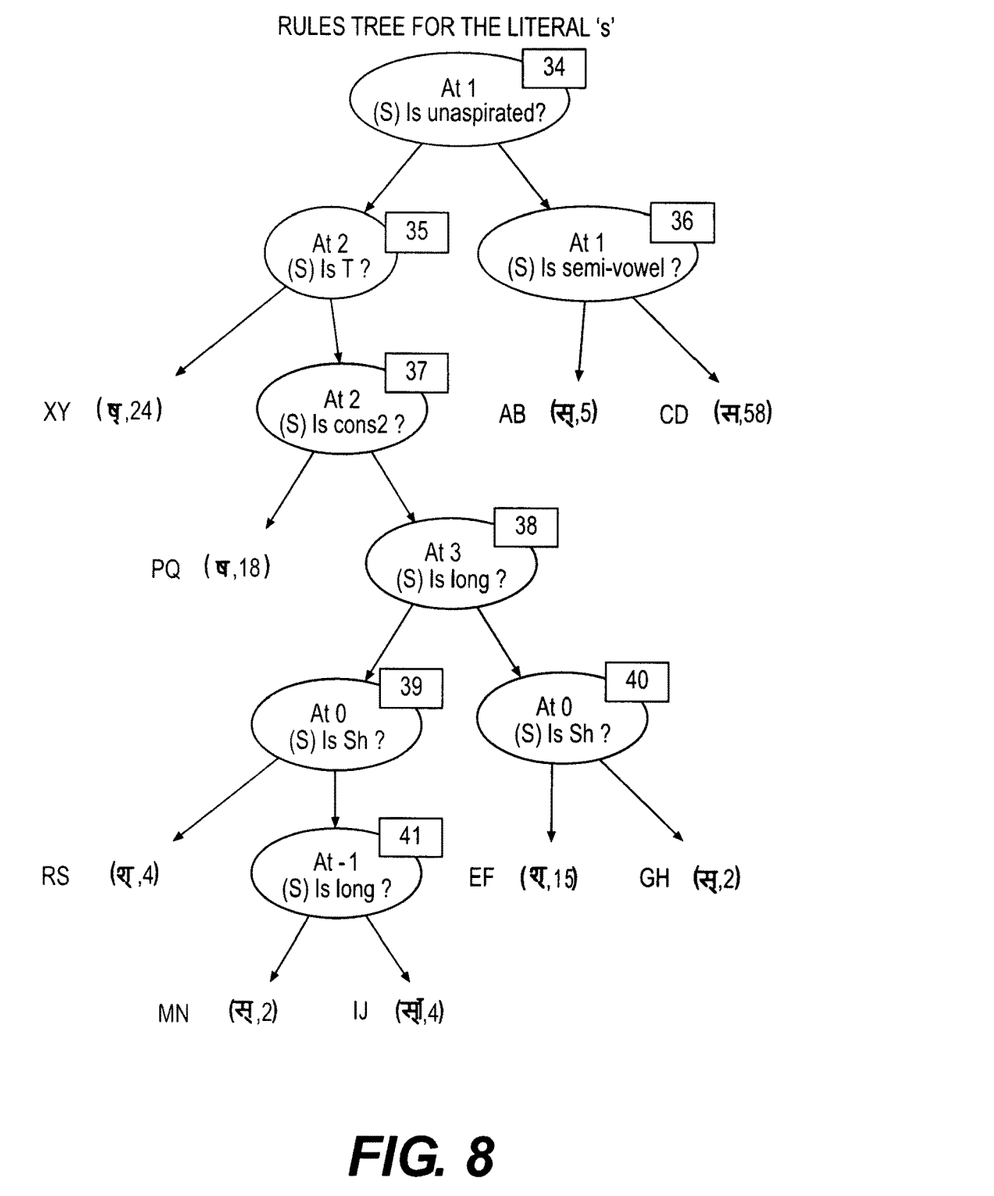
FIG. 8 shows the successfully completed decision tree for the letter 's' as a result of applying the algorithm described in FIG. 7.

FIG. 8 shows a 'completed tree for the letter 's'. The node 34 asks whether the character immediately following the character 's' is unaspirated. If it is, at node 35 the $2^{nd}$ character following 's' is examined or else at node 36 the $1^{st}$ character immediately following the character 's' is examined. If the 2nd character happens to be 'T', the node shown in the leaf node XY (ष्, 24) is produced as the output. If the first character happens to be semi-vowel, the node shown in the leaf node AB (स,5) is produced as the output and CD (स,58) otherwise. If the 2nd character examined at node 35 doesn't happen to be a 'T', the node 37 is used to examine if the 2nd character preceding 's' belongs to the group 'consonant2'. If it does, the leaf node PQ(ष,18) is produced as the output otherwise the node 38 is used to examine if the 3rd character following 's' is long and if it is, at node 39 the character 's' is examined, if the character happens to be Sh, the node shown in RS (श,4) is produced as the output or else at node 41 the $1^{st}$ character immediately preceding 's' is examined, if the first preceding character happens to be 'long', the node shown in the leaf node MN (स, 2) is produced as the output and IJ (स4) otherwise. At node 38 if the 3rd character following 's' is examined for long and if it is not, at node 40 the character 's' is examined, if the character does not happens to be 'Sh', the node shown in EF (श, 15) is produced as the output and GH(स, 2) otherwise. This completes the decision tree of the letter 's'

The following are the most important advantages of Transliteration Engine over the current Transliteration systems:

1. Intuitive Typing—Forget the Rules.

You need not remember any rigid rules and type according to them. For example: You can simply type: "beluru halebeedugala shilpakale karnatakada ondu vishesha" and Transliteration Engine will convert it into "ಬೇಲೂರು ಹಳೆಬೀಡುಗಳ ಶಿಲ್ಪಕಲೆ ಕರ್ನಾಟಕದ ಒಂದು ವಿಶೇಷ"." Where as, to get the same sentence in transliteration systems supported by Baraha, you may have to type "bElUru haLEbIDugaLa shilpakale kamATakada oMdu vishESha". If you type it intuitively like "beluru halebeedugala shilpakale karnatakada ondu vishesha" today's transliteration systems may transliterate it as, "ಬೆಲುರುಹಲೆಬೀಡುಗಲ ಶಿಲ್ಪಕಲೆ ಕರ್ನತಕದ ಒನ್ದು ವಿಶೆಶ".

2. Fuzziness

Transliteration Engine is very flexible. It doesn't require the user to type j~jAna to get the word "ಜ್ಞಾನ". Instead it can naturally provide fuzzy transliteration to the desired word even if the user types any of the possible intuitive inputs like: gnaalia, jnaana, gnyana, jnyana etc. You do not have to worry about an exact way of typing in to get the word you want to type.

3. Predictive Transliteration Based on Patterns from Learnt Knowledge Base

Transliteration Engine works by applying patterns from its learnt knowledge base and not by matching words in any database. Thus most of the times it can predict the correct transliteration of an input even if that particular word did not exist during the training. This advantage is not available with dictionary based mechanisms like T9.

4. Multiple Options

Sometimes a particular input may have two different transliterations. Transliteration Engine can show such available transliterations as options to the user.

5. Trained using Machine Learning Techniques

It uses generic Machine Learning techniques to learn the patterns. So Transliteration Engine can learn to transliterate any language within a matter of a couple of hours of training. The language can be Hindi, Arabic or any other language which can use the English alphabet to write in alternatively. Training happens with zero manual intervention.

6. Adaptive—Learning On the Fly

Transliteration Engine may not be able to show all the words correctly at present, though it does a perfect job more than 95% of the times. To assist that, it is supplemented with the standard transliteration way of typing as well. However, since Transliteration Engine is based on Machine Learning it will continuously adapt over time by learning new patterns along with the usage. Over next couple of months, it can capture most of the patterns you will ever need to use for typing in your mother tongue.

I claim:

1. A method to generate transliteration of source language script into target language script using decision tree based technique with automated supervised learning, said method comprising steps of
   i. selecting text to identify predetermined character to train particular instance of usage of identified character;
   ii. representing various possible phonetic and/or pseudo-phonetic translations of identified character to generate a multitude of transliterated words;

iii. grouping generated words followed by annotating them with predetermined information;
iv. analyzing annotated words to generate possible decision questions to map the characters under predetermined focus number, wherein the step of analyzing is performed by a computer system; and
v. applying predetermined rules on analyzed words to generate transliteration of the source language into the target language.

2. The method as claimed in claim 1, wherein the method used to generate transliteration is independent of the languages.

3. The method as claimed in claim 1, wherein the method provides predetermined rules for reverse transliteration from the target language script to the source language script.

4. The method as claimed in claim 1, wherein the source language is a keyboard language preferably English and target language is any predetermined language preferably selected from a group comprising Kannada, Hindi, Telugu, Tamil, Marathi, Malayalam and Gujarati.

5. The method as claimed in claim 1, wherein the character is identified by means of any representational scheme such as Unicode.

6. The method as claimed in claim 1, wherein predetermined properties/characteristics corresponding to different characters of the target language, independent of the method itself are used in forming the decision question.

7. The method as claimed in claim 1, wherein the multitude of possible transliterations is used to train the transliteration engine.

8. The method as claimed in claim 1, wherein the information for annotating the words is position of the character within a word under focus and generated target language character.

9. The method as claimed in claim 1, wherein the method provides frequencies of the words from the text by maintaining a running counter for each unique word.

10. The method as claimed in claim 1, wherein the position of the character is indexed beginning with the number zero.

11. The method as claimed in claim 1, wherein the predetermined rules are selected for a character depending upon the semantic-groups to which it belongs.

12. The method as claimed in claim 1, wherein the method automatically learns the particular language word patterns by parsing web pages and/or predetermined documents containing language content.

13. The method as claimed in claim 1, wherein the method automatically predicts the transliteration of each letter depending on context around the letter.

14. The method as claimed in claim 1, wherein the method operates by applying patterns from its learnt knowledge base rather than matching words in any database.

15. The method as claimed in claim 1, wherein the method captures frequency of each letter in a context specific manner to determine the mapping.

16. The method as claimed in claim 1, wherein the method performs reverse transliteration from predetermined language to the source language.

17. The method as claimed in claim 1, wherein the method uses semantic context rather than character level context to identify the transliteration.

18. The method as claimed in claim 1, wherein the method automatically transliterates source language words to target language based on native pronunciation of the target language.

19. The method as claimed in claim 1, wherein the method shows available multiple transliterations for a particular input text to choose the most appropriate transliteration.

20. The method as claimed in 1, wherein the method, with heuristics to decide whether the input is for predictive or non-predictive rule-based transliteration, provides options for rule-based input as well without the user explicitly having to choose a user interface element to switch between the predictive and non-predictive modes.

21. The method as claimed in claim 1, wherein analyzing annotated words to generate possible decision questions includes
i. generating all possible tuples of semantic-groups along with a focus number;
ii. applying rules representing generated tuples to set of training words;
iii. dividing the training words into two sets depending upon whether the words satisfies the query posed by the tuples or not; and
iv. adding the tuple as a node for two sets of trained words to generate the decision tree.

22. The method as claimed in claim 21, wherein the method is repeated until the entire set of words is found to be segregated or none of the rules is able to decide between the words at leaves of the tree.

23. The method as claimed in claim 21, wherein the focus number specifies context around the particular letter on which rules are to be applied.

24. The method as claimed in claim 21, wherein the focus number is a predetermined number preferably between −4 and 4.

25. The method as claimed in claim 21, wherein first set of the two sets comprises the words for which the question asked by the tuple is answered "yes" and other is answered "no".

26. The method as claimed in claim 21, wherein the method used to generate decision tree is language independent.

27. The method as claimed in claim 21, wherein the semantic-groups are language/pronunciation related groupings like vowel, consonant, long vowel, short vowel, aspirated, unaspirated or non-language related predetermined groups like groupA, groupB etc.

* * * * *